Patented Mar. 6, 1951

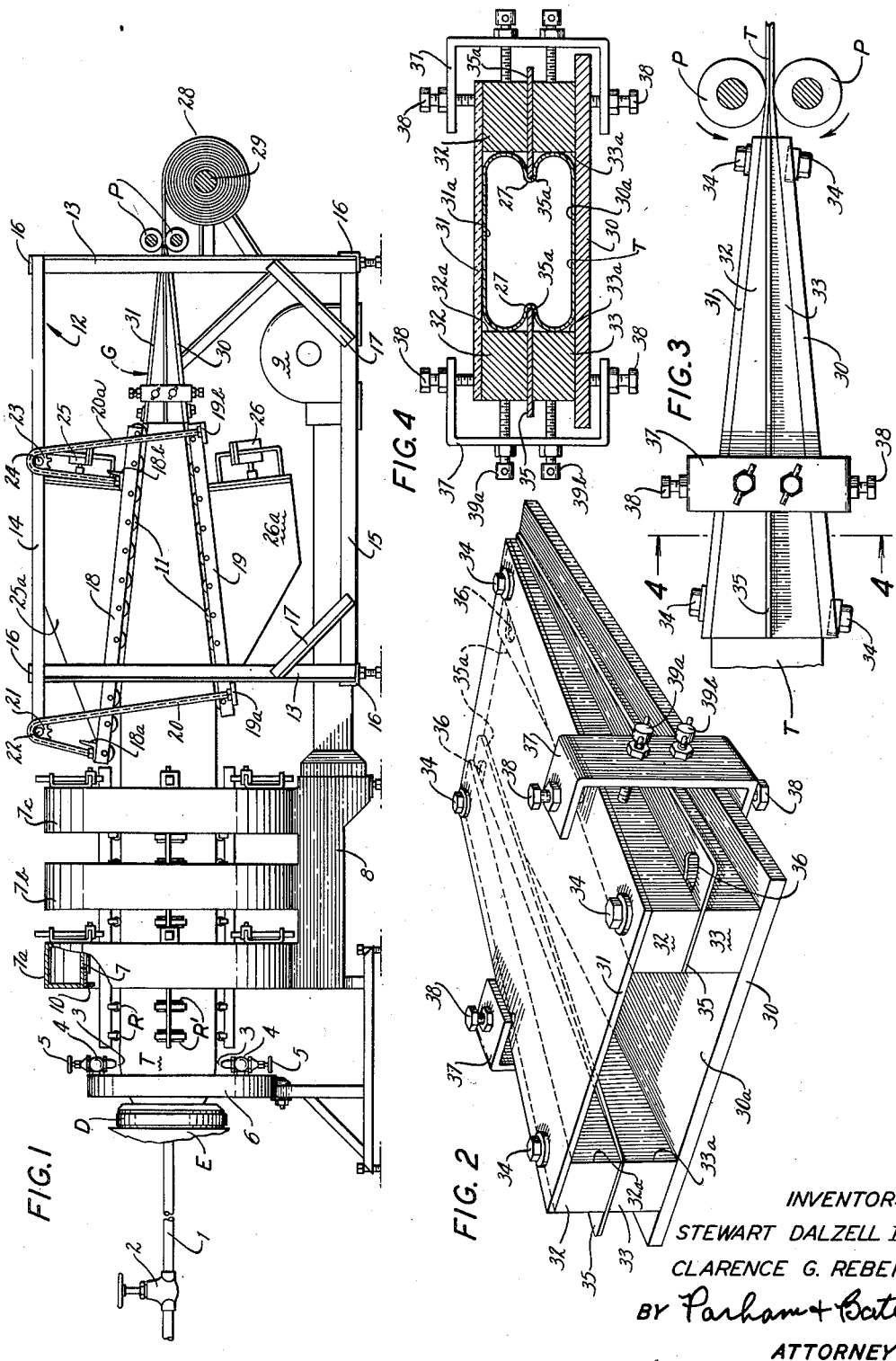

2,544,044

UNITED STATES PATENT OFFICE 2,544,044

APPARATUS AND METHOD FOR PRODUCING GUSSETED PLASTIC TUBING

Clarence G. Reber, Newington, Conn., and Stewart Dalzell, III, Brookline, Mass., assignors to Plax Corporation, West Hartford, Conn., a corporation of Delaware Application July 14, 1948, Serial No. 38,606

17 Claims. (Cl. 18—14)

The present invention relates to the manufacture of gusseted thin wall tubing from thermoplastic materials. Polyethylene is an example of a thermoplastic material which, under suitable temperature and pressure conditions, can be extruded as tubing of a desired thickness and size.

There is a large demand in the packaging and related fields for flexible plastic tubing of various diameters and with wall thickness of a few thousandths of an inch. In order to satisfy a large part of this demand, the tubing must be supplied in rolls of continuous lengths which are gusseted along diametrically opposite elements of the tubing and collapsed. The gussets or tucks must be of uniform and equal size or depth. Considerable difficulty has been experienced in extruding and forming, in a continuous operation, tubing which satisfies these requirements and, in particular, in satisfying the close tolerance requirements which include holding to uniform diameter and thickness and to uniform collapsed or flat width with gussets of equal and even depth.

It is an object of the present invention to provide a process of and apparatus for manufacturing gusseted thermoplastic tubing which satisfies the above-mentioned requirements.

A further object is to provide process and apparatus for extruding and gusseting tubing in which the sizing of the tubing and the formation of the gusset is achieved, in part, by the same internally applied fluid pressure.

Another object is to provide apparatus including adjustable mechanism, which in cooperation with the internal fluid pressure, successively sizes and gussets tubing passing therethrough.

Other objects and advantages will be apparent to those skilled in the art from the following detailed description of an embodiment of the invention.

The process of the invention in general comprises extruding a hot thin wall thermoplastic tubing, controlling the temperature of the extruded tubing, expanding by fluid pressure the portion of the tubing thus controlled as to temperature, cooling and setting the expanded tubing, and gusseting and collapsing the tubing in a continuous operation.

The invention accordingly includes the above-mentioned several steps and the relation of one or more of those steps to each of the others, as well as the apparatus for performing the steps in proper relationship, substantially as exemplified in the apparatus and its mode of operation hereinafter disclosed and claimed.

For a more detailed description of the invention, reference is made to the attached drawing in which:

Figure 1 is a side elevation of apparatus for producing gusseted and collapsed tubing in accordance with the invention;

Fig. 2 is an enlarged perspective view of the gusseting portion of the apparatus illustrated in Fig. 1;

Fig. 3 is an enlarged view of the gusseting portion of the apparatus shown in Fig. 1; and Fig. 4 is a cross-sectional view of the gusseting portion of the apparatus taken along line 4—4 of Fig. 3.

Referring to Fig. 1 of the drawing, the illustrated embodiment of the present invention includes a tubing die D from which a thin wall tubing T may be continuously extruded. A suitable extruder mechanism, which is fragmentarily shown at E, and which may include heating, homogenizing, and pressure producing parts or components, is provided for forcing a plastic material, such as polyethylene, through the die D under proper extrusion conditions of temperature, pressure and homogeneity.

Extending through the die D is a pressure line 1 controlled by a valve 2 through which a suitable fluid as, for example, air is introduced to maintain a desired pressure within the tubing T and expand it to a desired diameter.

The tubing T issuing from the die D is air cooled as it passes through a ring or circle of fishtail, gas-burner type, jets 3 which are mounted on a circular manifold 6. Manually operable needle valves 5 individually control the cooling air supplied to the jets 3 from the circular manifold 6 which is connected to a compressed air supply (not shown).

While for clarity of illustration only two of the jets 3 are illustrated in the drawings, in actual practice a much larger number, as for example, twenty, are provided at equally spaced intervals about the manifold ring 6. The air from the jets 3 reduces the temperature and, consequently, the plasticity of the extruded tubing. Differential regulation of the several jets serves to control uniformity of thickness of the blown tubing. Thus, when the tubing is blowing up unevenly and a thin streak develops, a little more air from the jet 3 overlying this particular streak gives additional chilling to that portion of the tubing. The additional chilling reduces expansion and thinning of the underlying portion and greater uniformity of thickness is obtained.

The tubing T next passes through a series of three annular wind boxes 7a, 7b, 7c which direct cooling air against the tubing. The several wind boxes 7a, 7b, 7c may be supplied with air under pressure of a few inches of water from a common manifold 8 and blower 9. The air thus supplied to the wind boxes may be discharged into contact with the tubing T through a series of openings 7 which may be located at spaced intervals in the inner peripheral wall of each wind box and individually regulated in size by sliding dampers 10 or comparable control valves.

A series of freely rotatable horizontal rolls R and vertical rolls R' are provided to support and control the size of the tubing. The rolls R and R' are arranged transversely of and tangentially to the periphery of the tubing in spaced circles which are coaxially disposed relative to the wind boxes 7a, 7b, 7c and, as so disposed, limit the diameter to which the tubing is blown, substantially as shown in Fig. 1. Although not necessary to an understanding of the present invention, a more complete description of the details of the rolls R and R' and their operation may be obtained by reference to the copending patent application Serial No. 56,895, of James Bailey filed October 27, 1948.

After passing through the wind boxes 7a, 7b, 7c and the rolls R and R', the tubing is partially collapsed by a roller assembly, which includes a series of metal rollers 11 located transversely of the tubing along two converging lines above and below the tubing substantially as shown and described in U. S. Patent Application Serial No. 2,936, filed January 17, 1948, now Patent No. 2,529,897 by Bailey and Reber.

The tube collapsing roller assembly includes a frame, generally designated 12, having vertical corner posts 13 secured in spaced relationship by upper and lower longitudinal frame members 14 and 15 and by transverse spacing members 16. Corner braces 17 give the frame necessary rigidity. The rollers 11 are journalled in pairs of upper and lower longitudinal frame members 18 and 19, respectively, the upper pair of frame members 18 being secured in proper spaced relation by fore and aft transverse members 18a and 18b and the lower pair of frame members 19 being similarly secured by fore and aft transverse members 19a and 19b. The forward end of the roller frames 18 and 19 are supported by the ends of chains 20, the latter being supported by sprockets 21 secured at the ends of a shaft 22 rotatably mounted in the forward ends of the members 14. Clockwise rotation (Fig. 1) of the sprockets 21 operates chains 20, so as to raise the forward end of the upper roller frame 18 and simultaneously lower the forward end of the lower roller frame 19 so as to enlarge the distance of the frame members 18 and 19 from the center line of the tubing T a like amount. As is apparent from the drawings, counterclockwise rotation of the sprocket 21 reduces the distance between the upper and lower roller frame members 18 and 19 a like amount above and below the center line of the tubing T.

The aft ends of the frame members 18 and 19 are similarly supported and their positions adjusted by chains 20a which engage sprockets 23 secured to the ends of a transverse shaft 24 rotatably journalled in the longitudinal frame members 14.

In order to assure sufficient cooling of the tubing and thus prevent sticking to the rollers 11, additional cooling is provided by like upper and lower blowers 25 and 26 which, respectively, are mounted on the upper and lower frames 18 and 19 and the air from which is directed by suitable ducts 25a and 26a towards both upstream banks of upper and lower rollers 11 and the portion of the tubing engaged thereby.

From the rolls 11, the tubing T is drawn by a pair of driven pulling rolls P through a gusseting mechanism, generally designated G, which acts to further collapse the tubing and, at the same time, in cooperation with the internal fluid pressure introduced and maintained through the pressure line 1, forms tucks, plaits or gussets 27 at the sides of the collapsing tube as is described in greater detail hereinafter. From the pulling rolls P, the fully collapsed and gusseted tubing is fed to and wound in a roll 28 upon the driven arbor 29 of a conventional winding mechanism (not shown).

Referring more particularly to the gusseting mechanism G and its operation, it includes a lower shaping member 30 and an upper shaping member 31 which are spaced apart in converging relationship by pairs of upper and lower tapering wedge members 32 and 33 located adjacent the side edges of the members 30 and 31. As shown in Figs. 2 and 3, the members 30 and 31 and the wedges 32 and 33 are adjustably secured together by conventional bolt and nut fasteners 34.

In the embodiment illustrated, inner surfaces 32a and 33a of each pair of wedges 32—33 are disposed in spaced vertical parallel planes located at equal distances from the axis or center line of the tube T which passes therebetween. Interposed between each pair of side wedges 32—33 is an inwardly projecting blade 35 having rounded inner edges 35a and slotted openings 36 through which the bolt fasteners 34 extend. The slots 36 permit adjustment of the blades 35 so that the edges 35a converge at the proper angle to deepen the gussets or folds 27 in the tube T as the latter is collapsed by the converging top and bottom forming walls 30a and 31a, and maintained at a desired width by the side walls 32a and 33a.

In accordance with the invention, means are provided for laterally adjusting the positions of the wedge members 32 and 33 relative to each other and to the members 30 and 31 to modify the gusseting chamber or passageway which they form to desired transverse cross-sections along its length. In the embodiment illustrated, the adjustment means comprises U-shaped clamps 37, each of which is provided with a pair of clamping screws 38 and a pair of upper and lower manually operable adjustment screws 39a and 39b. As shown in the drawing, the clamping screws 38, when tightened, grip corresponding edges of the inclined members 30 and 31 therebetween and locate the screws 39a and 39b normal to the outer surfaces of the respective wedges 32 and 33 so that the latter are forced inwardly when their adjustment screws 39a and 39b are tightened.

While, for simplicity of illustration, only one adjustment clamp 37 is provided for each pair of wedges 32—33, it will be understood that in practice an adjustment device, such as is provided by the clamp 37 and adjustment screws 39a and 39b, may be located adjacent the ends of each pair of wedges 32—33 so that adjustment may be effected readily at both ends without moving the clamp 37 first to one and then the other end.

It also will be apparent that, in addition to the screws 39a and 39b for inwardly advancing the wedges, the adjustment clamp 37 may include tension bolts for retracting the wedges 32 and 33, or alternatively, the screws 39a and 39b may be rotatably secured against lateral movement in the wedges so that the wedge may be advanced and retracted by operation of a single screw. Similar adjustment screws also may be provided for advancing and retracting the gusset blades 35 within the limits permitted by the adjustment slots 36 and the bolt fasteners 34.

Regardless of the refinements provided for adjusting the wedges 32 and 33 and the gusset blades 35, it is important that provision be made, as in the illustrated apparatus, for effecting adjustment without interrupting the flow of tubing T through the gusseting device G.

In order to facilitate accurate adjustment, the upper board 31 may be formed of glass or other transparent material such as polystyrene or methacrylate so that the engagement of the tube with several interior forming surfaces may be viewed therethrough. The transparent member 31 is particularly desirable where the tubing being formed and gusseted, itself, is transparent.

In practice, it is preferable for the rolls P to pull the tubing T straight away from the die D and to arrange the ring of jets 3; the spaced circles of rollers R and R'; the wind boxes 7a, 7b and 7c; the inclined upper and lower banks of rollers 11; and the gusseting device G generally symmetrically to the center line of the tubing and equally spaced therefrom at any given transverse cross-section. This particularly is desirable with reference to the pulling rolls P and the gusseting device G where any offset of the contact line of the rolls from the plane of the gusseting blades 35 tends to produce unequal folds above and below the gusset line.

In operation, the extruded tubing T is blown by air into sizing contact with the rollers R and R' where it is set against further plastic deformation. Thereafter, the same air pressure blows the portion of the tubing in the gusseting device into the shape shown in Fig. 4.

The creasing is accomplished by the blades 35, the side wedges 32—33 serving to control the width of the top and bottom folds. The inflating pressure causes the tubing to fill the forming cavity or passageway throughout its entire length. The rolls 11 exert sufficient longitudinal tension to prevent the inflating pressure from disturbing the gusset folds between the confining passageway and the rolls.

As the creasing is done by the blades 35, it is necessary to use the side boards or wedges 32—33 to control the width of the top and bottom folds. The wedges are controlled independently and are used to keep the folds even. It is preferable that the plastic tube fill up the form along the entire length of the unit. Otherwise, the stability of the process may be lost and the gusset size not maintained. To keep the gusseting form full, the tube must have a closely controlled diameter. If too big, it is pinched and wrinkles form. If too small, the folds become uneven.

In gusseting, it is necessary to have sufficient air pressure within the tube to insure the form filling out. This is accomplished by blowing up the extrusion to obtain the size, rather than drawing down. Too much air pressure within the tube can be troublesome, in that it pushes the plastic against the wedges. This increases the friction and may cause wrinkles. This friction can be overcome by using spaced roller assemblies in, or in place of, the wedges, or alternatively, materials which offer less resistance to the movement of the tubing. From the gusseting device G, the tubing is drawn continuously in a gusseted and collapsed condition through the rolls P and fed to the winding arbor 29 where it is rolled as at 28.

Any tendency for tubing, which is smooth as it comes from the rolls P, to wrinkle as it is wound may be overcome by adjusting the alignment of the winding roll 28 and by increasing the air from the jets 3 adjacent the parts of the tubing that are too long.

Having thus described the invention, we claim:

1. The process of forming gusseted tubing of thermoplastic material which includes continuously extruding thermoplastic material through an annular die to form tubing, introducing fluid pressure into the upstream portion of the tubing, blowing successive portions of the tubing within spaced sizing rollers to a predetermined size larger than its extrusion diameter, blowing said expanded tubing into shaping contact with an external gusseting passageway, and collapsing the gusseted tubing.

2. The process of forming tubing of thermoplastic material which includes continuously extruding thermoplastic material through an annular die to form tubing, introducing fluid pressure into the upstream portion of the tubing, expanding successive portions of the tube by blowing to a predetermined size larger than its extrusion diameter, tucking a portion of the tubing inwardly against said internal fluid pressure, and collapsing said inwardly tucked tubing.

3. The process of forming thin-wall tubing of thermoplastic material which includes continuously extruding said material in a heated and plastic condition through an annular die to form tubing, establishing a greater internal than external fluid pressure on the tubing as it is extruded in a heated, deformable condition from the die, expanding said heated portion of the tubing by means of said pressure differential to a predetermined greater diameter, cooling said expanded material below its temperature of plasticity and thereby setting said expanded tubing, tucking said tubing radially inward against said internal pressure, and collapsing said inwardly tucked tubing.

4. The process of forming gusseted thin-wall tubing of thermoplastic material which includes continuously extruding said material in a heated and plastic condition through an annular die to form tubing, establishing a greater internal than external fluid pressure in the tubing as it is extruded in a heated, deformable condition from the die, expanding said heated portion of the tubing by means of said pressure differential to a predetermined greater diameter, cooling said expanded material below its temperature of plasticity and thereby setting said expanded tubing, gusseting said set tubing inwardly against said internal pressure, collapsing and winding said gusseted tubing in a roll, and regulating the aforesaid cooling differentially about the circumference of said expanded tubing to obtain a substantially wrinkle-free roll of said gusseted tubing.

5. The process of forming gusseted thin-wall tubing of thermoplastic material which includes continuously extruding said material in a heated and plastic condition through an annular die to form tubing, inflating the tubing with an internal fluid pressure as the tubing is extruded, cooling said thermoplastic material below its temperature of plasticity and thereby setting said tubing, gusseting said inflated tubing, and collapsing the gusseted tubing while maintaining longitudinal and lateral tension on said inflated tubing.

6. The process of forming gusseted thin-wall tubing of thermoplastic material which includes continuously extruding said material in a heated and plastic condition through an annular tubing die to form a tube, establishing a greater internal than external pressure on the tube as it is extruded in a heated, deformable condition from the die, expanding said heated portion of the tube by means of said pressure differential to a predetermined greater diameter, positively limiting the diameter to which the tube is expanded, cooling said expanded tube below its temperature of plasticity and thereby setting said expanded tube, regulating said cooling differentially about the circumference of said expanded tube, progressively gusseting and collapsing said tube, and winding said collapsed and gusseted tubing upon a winding device.

7. The process of forming gusseted thin-wall tubing of thermoplastic material which includes continuously extruding said material in a heated and plastic condition through an annular tubing die to form a tube, establishing a greater internal than external pressure on the tube as it is extruded in a heated, deformable condition from the die, expanding said heated portion of the tube by means of said pressure differential to a predetermined greater diameter while restraining excessive expansion, cooling said expanded material below its temperature of plasticity and thereby setting said expanded tubing, regulating said cooling differentially about the circumference of said expanded tubing, further cooling said tubing while progressively gusseting and collapsing said inflated tubing, and winding said collapsed and gusseted tubing upon a winding device.

8. Apparatus for forming gusseted tubing of thermoplastic material including an annular tubing die, an extruder for continuously extruding thermoplastic material from the annular die in the form of a tube, means for introducing fluid pressure into the tube to inflate successive portions of the tube, means for gusseting the inflated tubing, and means for collapsing the gusseted tubing.

9. Apparatus for forming gusseted tubing of thermoplastic material including an annular tubing die, an extruder for continuously extruding heated thermoplastic material from the annular tubing die to form a tube, means for collapsing the tube downstream of the die, means for gusseting said tube, and means for introducing fluid pressure into the upstream portion of the tube to blow successive portions of the tube to a predetermined size larger than its extrusion diameter and into shaping contact with said gusseting means.

10. Apparatus for forming gusseted tubing of thermoplastic material including an annular tubing die, an extruder for continuously extruding heated thermoplastic material from the annular die to form a tube, means for collapsing the tube downstream from the die, means for introducing inflating fluid pressure into the tube, a confining passageway through which said inflated fluid pressure passes having blades extending into said passageway for gusseting the inflated tube, and means for adjusting the size of said passageway while said tube is passing therethrough.

11. Apparatus for forming gusseted tubing of thermoplastic material including an annular tubing die, an extruder for continuously extruding heated thermoplastic material from the annular die to form a tube, means for collapsing the tube downstream from the die, means for introducing inflating fluid pressure into the tube, a confining passageway through which said inflated fluid pressure passes including blades extending into said passageway for gusseting the inflated tube, and means for adjusting said blades within said passageway as said tube passes therethrough.

12. Apparatus for forming gusseted tubing of thermoplastic material including an annular tubing die, an extruder for continuously extruding heated thermoplastic material from the tubing die to form a tube, an adjustable roller assembly downstream of the die for partially collapsing the tube, means for regulating the angle at which the tube is collapsed by said roller assembly, means for gusseting and further collapsing said tube, means for introducing inflating fluid pressure into the upstream portion of the tube to inflate said tube against said adjustable roller assembly and said gusseting means, and means for completely collapsing the gusseted tube and drawing the tube under tension from the die.

13. Apparatus for forming gusseted tubing of thermoplastic material as it is extruded from a tubing die in a plastic condition including means for inflating the plastic tubing, means for sizing and setting said tubing in a non-plastic condition, means for gusseting the inflated tubing, and means for drawing said tubing from the die and said gusseting means and deflating the gusseted tubing.

14. Apparatus for gusseting tubing formed by extruding thermoplastic material from a tubing die including means for inflating said tubing, means for controlling the size and thickness of the inflated tubing, means for setting the inflated tubing in a predetermined size, a passageway for collapsing the set tubing including an opposite pair of converging top and bottom walls, adjustable side walls, and converging gusseting blades projecting into said passageway from said side walls, and means for drawing said tubing from said die through said passageway and between said gusseting blades.

15. The apparatus recited in claim 14 including means for adjusting said side walls to vary the cross-section of said passageway.

16. The apparatus recited in claim 14 including means for varying the angle of convergence of the gusseting blades in the passageway.

17. The apparatus recited in claim 14 including means for adjusting the distance from the side walls which the gusseting blades extend into the passageway.

CLARENCE G. REBER.
STEWART DALZELL, III.

REFERENCES CITED

The following references are of record in the file of this patent:

UNITED STATES PATENTS

| Number | Name | Date |
|---|---|---|
| 333,646 | Lorenz | Jan. 5, 1886 |
| 467,553 | Ehst | Jan. 26, 1892 |
| 2,047,554 | Fischer | July 14, 1936 |
| 2,337,927 | Reichel | Dec. 28, 1943 |

FOREIGN PATENTS

| Number | Country | Date |
|---|---|---|
| 431,619 | Great Britain | July 11, 1935 |